(12) United States Patent
Yoshihara et al.

(10) Patent No.: US 7,708,319 B2
(45) Date of Patent: May 4, 2010

(54) PIPING JOINT STRUCTURE

(75) Inventors: Hitoshi Yoshihara, Nagasaki-ken (JP);
Shirou Ishise, Nagasaki-ken (JP);
Kiyoshi Miyazaki, Nagasaki-ken (JP);
Kouji Okamoto, Nagasaki-ken (JP);
Noriyasu Kajihara, Nagasaki-ken (JP);
Takanobu Tokunaga, Hiroshima-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 176 days.

(21) Appl. No.: 11/581,572

(22) Filed: Oct. 17, 2006

(65) Prior Publication Data
US 2007/0216159 A1   Sep. 20, 2007

(30) Foreign Application Priority Data
Mar. 14, 2006   (JP)   ............................... 2006-069134

(51) Int. Cl.
*F16L 13/02* (2006.01)
(52) U.S. Cl. ................................ 285/288.1; 285/288.2
(58) Field of Classification Search ................. 285/416, 285/288.2, 288.1, 288.6
See application file for complete search history.

(56) References Cited

U.S. PATENT DOCUMENTS

| | | | | |
|---|---|---|---|---|
| 1,810,825 A * | 6/1931 | Furrer | ........................... | 285/22 |
| 1,842,298 A * | 1/1932 | Smith | ........................... | 285/55 |
| 1,872,271 A * | 8/1932 | Furrer | ........................... | 285/22 |
| 1,903,315 A * | 4/1933 | Priebe | ........................... | 285/22 |
| 1,980,561 A * | 11/1934 | Wagner | ........................ | 285/22 |
| 2,037,962 A * | 4/1936 | Brown | .......................... | 285/22 |
| 2,324,335 A * | 7/1943 | Taylor | ........................... | 285/22 |
| 2,646,995 A * | 7/1953 | Thompson | .............. | 285/288.11 |
| 2,732,229 A * | 1/1956 | Gaum | ........................ | 285/21.1 |
| 2,792,490 A * | 5/1957 | Risch et al. | ............. | 219/137 R |
| 2,878,040 A * | 3/1959 | Hobbs | ...................... | 285/288.1 |
| 2,895,747 A * | 7/1959 | Bland et al. | ................ | 285/21.1 |
| 3,026,910 A * | 3/1962 | Cawker et al. | ................ | 138/44 |
| 3,677,580 A * | 7/1972 | Klanke | ........................ | 285/184 |
| 3,709,529 A * | 1/1973 | Mains | ................... | 285/288.11 |
| 3,814,397 A * | 6/1974 | Geist et al. | ............... | 261/114.1 |
| 4,640,532 A * | 2/1987 | Pope | ........................... | 285/41 |
| 4,681,349 A * | 7/1987 | Press et al. | ..................... | 285/55 |

(Continued)

FOREIGN PATENT DOCUMENTS

JP   S62-270281   11/1987

(Continued)

*Primary Examiner*—David E Bochna
(74) *Attorney, Agent, or Firm*—Kanesaka Berner & Partners

(57) ABSTRACT

A piping joint that enables welding without back shielding and without oxidized scaling on the pipe's inner surface. A piping joint has an inner fitting portion formed around the circumference of an end of a first tubular material, and a first bevel is formed on the radial outside of the inner fitting portion around the circumference. An outer fitting portion, fitted to the radial outside of the inner fitting portion, is formed on the end of a second tubular material butt welded to the first tubular material, and a second bevel is formed around the circumference at the end of the outer fitting portion facing the first bevel. The cross-section of the face of the inner fitting portion located on the radial outside, and the cross-section of the face of the outer fitting portion located on the radial inside, are completely round with a constant circumferential curvature.

19 Claims, 14 Drawing Sheets

U.S. PATENT DOCUMENTS

| | | | | |
|---|---|---|---|---|
| 5,219,187 A | * | 6/1993 | Mikitka | 285/55 |
| 5,388,863 A | * | 2/1995 | Omar | 283/55 |
| 5,685,571 A | * | 11/1997 | Gardner | 285/12 |
| 6,142,359 A | * | 11/2000 | Corbishley et al. | 228/104 |
| 6,231,086 B1 | * | 5/2001 | Tierling | 285/123.15 |
| 6,431,274 B1 | * | 8/2002 | Nowlin et al. | 166/187 |
| 6,471,249 B1 | * | 10/2002 | Lewis | 285/31 |
| 6,533,326 B1 | * | 3/2003 | Socier et al. | 285/55 |
| 6,543,811 B1 | * | 4/2003 | Campbell | 285/16 |
| 6,939,083 B2 | * | 9/2005 | Tosi et al. | 405/170 |
| 7,243,409 B2 | * | 7/2007 | Lewis | 29/469 |

FOREIGN PATENT DOCUMENTS

| | | |
|---|---|---|
| JP | H02-87592 | 7/1990 |
| JP | H11-90676 | 4/1999 |

* cited by examiner

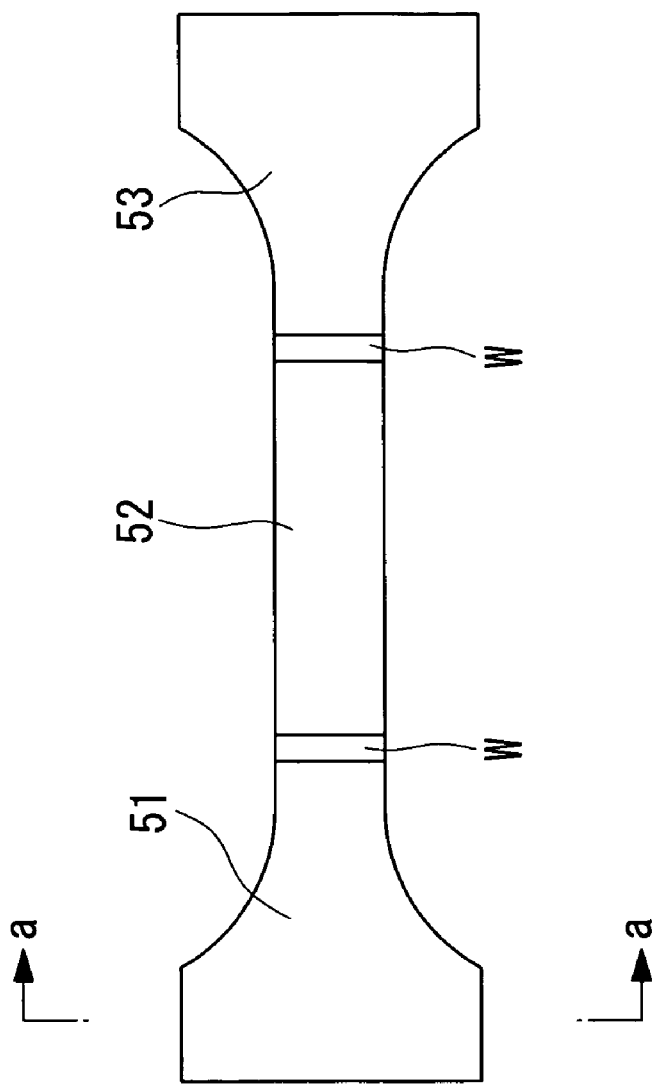
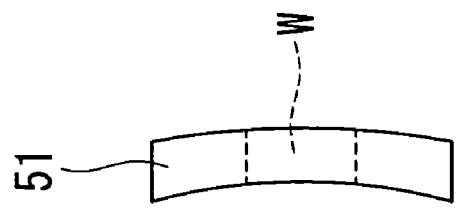

FIG. 17

UNITS : mm

| PIPE SIZE | a1 TOLERANCE ±0.1 | b1 TOLERANCE ±0.1 | c1 TOLERANCE ±0.1 | d1 TOLERANCE ±0.1 | c1-c2 (GAP) TOLERANCE ±0.1 |
|---|---|---|---|---|---|
| 100A | 97.1 | 7 | 101 | 3 | 1.0~1.6 |
| 150A | 158.2 | 7 | 151 | 3.5 | 1.0~1.6 |
| 200A | 209.3 | 7 | 199.9 | 3.5 | 1.0~1.6 |

FIG. 18

UNITS : mm

| PIPE SIZE | a2 TOLERANCE ±0.1 | b2 TOLERANCE ±0.1 | c2 TOLERANCE ±0.1 | d2 TOLERANCE ±0.1 |
|---|---|---|---|---|
| 100A | 102.3 | 7 | 103.6 | 5.35 |
| 150A | 151 | 7 | 152.3 | 6.45 |
| 200A | 199.9 | 7 | 201.2 | 7.5 |

US 7,708,319 B2

PIPING JOINT STRUCTURE

BACKGROUND OF THE INVENTION

1. Field of the Invention

The present invention relates to a piping joint structure. In particular, it relates to a piping joint structure that joins adjacent pieces of tubing material by butt welding.

2. Description of Related Art

As a conventional piping joint structure, there is one that is disclosed in a Japanese Unexamined Patent Application, First Publication No. Sho 62-270281. In the piping joint structure disclosed in Japanese Unexamined Patent Application, First Publication No. Sho 62-270281, in the case where stainless steel tubing materials are connected by butt welding, in order to prevent the weld zone from oxidizing on the outer surface side of the tubing materials, a method of inert gas welding from the outer peripheral surface side is used, in which the welding is performed in a state in which air is excluded from the weld zone by an inert gas such as helium gas, argon gas, or the like. Similarly in order to prevent the weld zone from oxidizing on the inner surface side of the tubing materials, so-called back shielding is performed in which the whole pipe is filled with an inert gas such as helium gas, argon gas, or the like.

However, in such a conventional method, a large amount of inert gas is required for back shielding inside the pipe. Therefore, there are problems of uneconomical wastage and high cost.

Furthermore, since it is difficult to completely back shield a pipe whose piping route is complex or long, the weld zone that is located on the inner surface side of the pipe becomes oxidized. Therefore, there is also a problem in that oxidized scale (also called "slag") occurs.

BRIEF SUMMARY OF THE INVENTION

The present invention has been made in view of the above circumstances, and has an object to provide a piping joint structure that enables welding without back shielding, and can prevent oxidized scale from occurring on the inner surface side of the pipe.

The present invention uses the following methods in order to solve the above problems.

A piping joint structure according to the present invention is a piping joint structure in which an end of a first tubular material and an end of a second tubular material, which is located adjacent to the first tubular material, are joined by butt welding, wherein an inner fitting portion is formed around the circumference on the end of the first tubular material, and a first bevel is formed on the radial outside of the inner fitting portion around the circumference, an outer fitting portion, which is fitted to the radial outside of the inner fitting portion, is formed on the end of the second tubular material, and a second bevel is formed around the circumference at a location that is at the end of the outer fitting portion and that faces the first bevel, and the shape of the cross-section of the face of the inner fitting portion located on the radial outside, and the shape of the cross-section of the face of the outer fitting portion located on the radial inside, are processed such that each is completely round with a curvature that is constant around the whole circumference.

According to such a piping joint structure, the first tubular material and the second tubular material are joined by fitting the inner fitting portion of the first tubular material into the inside of the outer fitting portion of the second tubular material, forming approximately V shaped cross-section bevels, for example, by the first bevel and the second bevel, and butt welding the bevel portion formed in the approximately V shaped cross-section, using a method of inert gas welding from the outer peripheral surface side, for example.

When the inner fitting portion of the first tubular material and the outer fitting portion of the second tubular material are fitted together, the internal edge of the V shaped cross-section bevels, for example, formed by the first bevel and the second bevel, is closed (sealed) by the outer peripheral surface of the inner fitting portion, and it is arranged such that there can be almost no gap between the outer peripheral surface of the inner fitting portion and the inner peripheral surface of the outer fitting portion.

If the welding is performed in this state, it is possible to prevent the internal edge of the weld zone from being exposed to the inside of the tube. Furthermore it is possible to prevent oxidized scale from occurring on the internal edge of the weld zone.

That is, according to the piping joint structure of the present invention, it is possible to eliminate back shielding at the time of welding, and furthermore it is possible to prevent oxidized scale from occurring in the tube.

Since the back shielding can be eliminated, inert gas, a large amount of which is conventionally required in order to perform back shielding, is not necessary, which enables cost reduction.

Furthermore, since oxidized scale can be prevented from occurring in the tube, flushing operations and hammering operations, which are conventionally required in order to eliminate oxidized scale that occurs in the tube, are not necessary, which enables the durations of construction, installation, and repair to be shortened significantly.

Furthermore, since oxidized scale can be prevented from occurring in the tube, it is possible to reliably prevent accidents in which oxidized scale contaminates a bearing such as in a power turbine provided on the downstream side, for example, thus damaging the bearing.

Moreover, it is possible to hold the gaps between the inner fitting portions and the outer fitting portions almost constant around the circumference, it is possible to join (weld) the first tubular materials and the second tubular materials efficiently, and it is possible to improve the working efficiency at the assembly site, which enables the working time to be shortened.

Regarding the tolerance from perfectly round of the diameter of the part processed, in the case where the diameter is between approximately 100 mm and 200 mm, for example, the tolerance may be ±0.1 mm for the diameter, that is between approximately 0.1% and 0.05% (refer to FIG. 17 and FIG. 18).

A piping joint structure according to the present invention is a piping joint structure in which an end of a first tubular material and an end of a second tubular material, which is located adjacent to the first tubular material, are joined by butt welding, wherein an inner fitting portion is formed around the circumference on the end of the first tubular material, and a first bevel is formed on the radial outside of the inner fitting portion around the circumference, and a second bevel is formed around the circumference at a location that is at the end face of the second tubular material and that faces the first bevel.

According to such a piping joint structure, the first tubular material and the second tubular material are joined by fitting the inner fitting portion of the first tubular material into the inside of one end (that is the end facing the inner fitting portion of the first tubular material) of the second tubular material, forming approximately V shaped cross-section bevels, for example, by the first bevel and the second bevel, and butt welding the bevel portion formed in the approximately V shaped cross-section, using a method of inert gas welding from the outer peripheral surface side, for example.

When the inner fitting portion of the second tubular material and one end of the second tubular material are fitted together, the internal edge of the V shaped cross-section bevels formed by the first bevel and the second bevel is closed (sealed) by the outer peripheral surface of the inner fitting portion, and it is arranged such that there can be almost no gap between the outer peripheral surface of the inner fitting portion and the one end of the outer fitting portion.

If the welding is performed in this state, it is possible to prevent the internal edge of the weld zone from being exposed to the inside of the tube. Furthermore it is possible to prevent oxidized scale from occurring on the internal edge of the weld zone.

That is, according to the piping joint structure of the present invention, it is possible to eliminate back shielding at the time of welding, and furthermore it is possible to prevent oxidized scale from occurring in the tube.

Since the back shielding can be eliminated, inert gas, a large amount of which is conventionally required in order to perform back shielding, is not necessary, which enables the cost to be reduced.

Furthermore, since oxidized scale can be prevented from occurring in the tube, flushing operations and hammering operations, which are conventionally required in order to eliminate oxidized scale that occurs in the tube, are not necessary, which enables the durations of construction, installation, and repair to be shortened significantly.

Furthermore, since oxidized scale can be prevented from occurring in the tube, it is possible to reliably prevent accidents in which oxidized scale contaminates a bearing such as in a power turbine provided on the downstream side, for example, thus damaging the bearing.

Moreover, since it is not necessary to provide an outer fitting portion at one end of the second tubular material, it is possible to reduce the time and cost required for processing the second tubular material.

In the above-described piping joint structure, it is desirable that this is processed such that a cross-sectional shape of a surface of the inner fitting portion located on the radial outside, and a cross-sectional shape of a surface of the end of the second tubular material located on the radial inside, are both completely round with a curvature that is constant around the whole circumference.

According to such a piping joint structure, it is possible to hold the gap between the inner fitting portion and the inner peripheral surface of one end almost constant around the circumference, it is possible to join (weld) the first tubular material and the second tubular material efficiently, and it is possible to improve the working efficiency at the assembly site, which enables the working time to be shortened.

Regarding the tolerance from perfectly round of the diameter of the part processed, in the case where the diameter is between approximately 100 mm and 200 mm, for example, the tolerance may be ±0.1 mm for the diameter, that is between approximately 0.1% and 0.05% (refer to FIG. 17 and FIG. 18).

In the above-described piping joint structure, it is desirable that a thickness of the inner fitting portion is greater than or equal to 3.0 mm.

According to such a piping joint structure, it is possible to prevent burnt remains due to welding from forming on the inner peripheral surface side of the pipe. If the thickness of the inner fitting portion is smaller than 3.0 mm, there is a possibility that burnt remains are produced on the inner peripheral surface side of the pipe, which is not desirable.

In the above-described piping joint structure, it is desirable that a difference between a diameter of a surface located on the radial outside of the inner fitting portion and a diameter of a surface located on the radial inside of the outer fitting portion, and a difference between a diameter of a surface located on the radial outside of the inner fitting portion and a diameter of a surface located on the radial inside of an end face of the second tubular material, are between 1.0 mm to 1.6 mm.

According to such a piping joint structure, if the welding is performed in a state in which the gap is maintained, it is possible to prevent the internal edge of the weld zone from being exposed to the inside of the tube, and it is possible to prevent oxidized scale from occurring on the internal edge of the weld zone. If the difference is smaller than 1.0 mm, then the state in which one tubular material is inclined against the other tubular material makes it difficult to join them. If the difference is greater than 1.6 mm, the inert gas existing outside the tube flows into the gaps between the surface of the inner fitting portion located on the radial outside, and the surface of the outer fitting portion located on the radial inside, or the gap between the surface of the inner fitting portion located on the radial outside and the surface of one end face of the second tubular material located on the radial inside. Consequently, there is concern that the weld metal spurts into the tube, which is not desirable.

A pipe according to the present invention is joined by any one of the above-described piping joint structures.

Using such a pipe, it is possible to weld the joining parts of one tubular material and another tubular material, which constitute the pipe, without back shielding, and it is possible to prevent oxidized scale from occurring on the inner surface side of the joining parts.

A plant according to the present invention contains the above-described pipes.

Using such a plant, since it is possible to weld the joining parts of one tubular material and another tubular material, which constitute a pipe, without back shielding, the duration of construction of the plant can be shortened significantly.

Furthermore, since it is possible to prevent oxidized scale from occurring on the inner surface side of the joining parts, it is possible to reliably prevent accidents in which oxidized scale contaminates a bearing such as in a power turbine provided on the downstream side, for example, thus damaging the bearing.

The present invention produces effects in which welding can be performed without back shielding, and oxidized scale can be prevented from occurring on the inner surface side of a pipe.

BRIEF DESCRIPTION OF THE SEVERAL VIEWS OF THE DRAWINGS

FIG. 14A and FIG. 14B are diagrams showing the shape of the test piece fitted in the fatigue testing machine, wherein FIG. 14A is a sectional diagram view through a-a of FIG. 14B, and FIG. 14B is a plan view.

FIG. 17 is a table showing the dimensions and tolerances of the second tubing material (primary tubing material).

FIG. 18 is a table showing the dimensions and tolerances of the third tubing material (secondary tubing material).

DETAILED DESCRIPTION OF THE INVENTION

Hereunder is a description of an example in which a first embodiment of a piping joint structure according to the present invention is applied to a lubricating oil pipe (referred to hereunder as "pipe") for a power turbine plant, with reference to the drawings.

Figure 1:
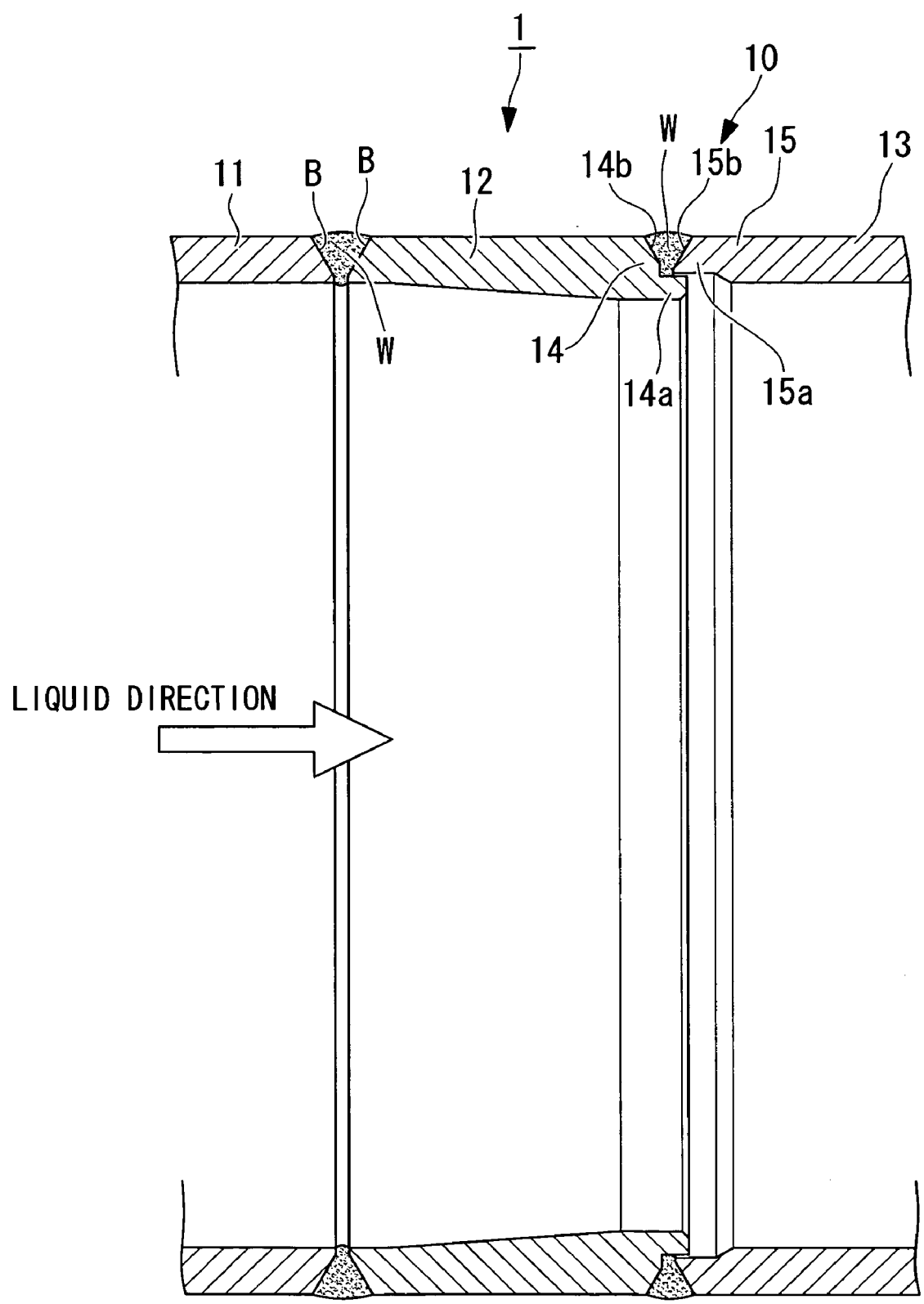
FIG. 1 is a development drawing in which a lubricating oil pipe for a power turbine containing a first embodiment of a piping joint structure according to the present invention is sectioned by a surface parallel to the lengthwise direction of the pipe and expanded.

FIG. 1 is a development drawing in which a pipe 1 having a piping joint structure 10 according to the present invention is sectioned by a surface parallel to the lengthwise direction of the pipe 1, and expanded.

The pipe 1 comprises a first tubular material 11, a second tubular material (primary tubular material) 12 and a third tubular material (secondary tubular material) 13 as its main elements. A piping joint structure 10 is provided between the second tubular material 12 and the third tubular material 13.

The first tubular material 11 is a stainless steel tubular material whose thickness is almost uniform throughout, and in which V shaped bevels B, for example, are formed on the faces of its two ends.

The second tubular material 12 is a stainless steel tubular material in which a V shaped bevel B, for example, is formed on the end face at the side facing the first tubular material 11, and a convex portion 14 of the piping joint structure 10 is formed on the opposite end (end at the side facing the third tubular material 13).

The third tubular material 13 is a stainless steel tubular material in which a concave portion 15 of the piping joint structure 10 is formed on the end at the side facing the second tubular material 12, and a V shaped bevel B, for example, is formed on the end face on the opposite side to the end face (end face at the side facing the first tubular material 11).

Figure 2:
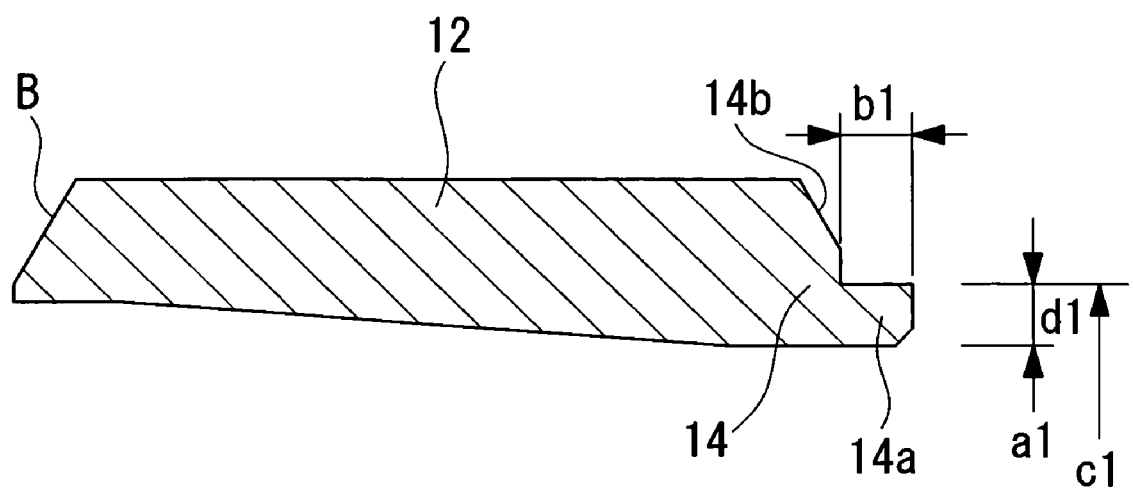
FIG. 2 is a sectional diagram in which a second tubing material (primary tubing material) as shown in FIG. 1 is sectioned by the surface parallel to the lengthwise direction of the pipe.

FIG. 2 is a sectional diagram in which the second tubular material 12 is sectioned by a surface parallel to the lengthwise direction of the pipe 1 (refer to FIG. 1).

As shown in FIG. 2, the second tubular material 12 is formed such that its thickness increases gradually from the bevel B side towards the convex portion 14. That is, the second-tubular material 12 is produced such that its inner diameter decreases gradually from the bevel B side towards the convex portion 14, and its outer diameter maintains almost the same measurement as the outer diameter of the first tubular material 11 from the bevel B side towards the convex portion 14.

The convex portion 14 has an inner fitting portion 14a which protrudes from the end face of the radial inside along the inner peripheral surface of the second tubular material 12, and a bevel portion (first bevel) 14b having a V shaped bevel, for example, formed on the end face on the radial outside.

The inner fitting portion 14a is a transverse annular portion, formed such that it has a constant thickness (preferably greater than or equal to d1=3.0 mm) around the whole circumference of the second tubular material 12, and the outer fitting portion 15a of the concave portion 15 is fitted on the inner fitting portion 14a on the radial outside (upper side of FIG. 2). Furthermore, the tolerance of the radial distance c1 from the central axis of the second tubular material 12 to the radial outside of the inner fitting portion 14a is ±0.1 mm (refer to FIG. 17).

Figure 3:
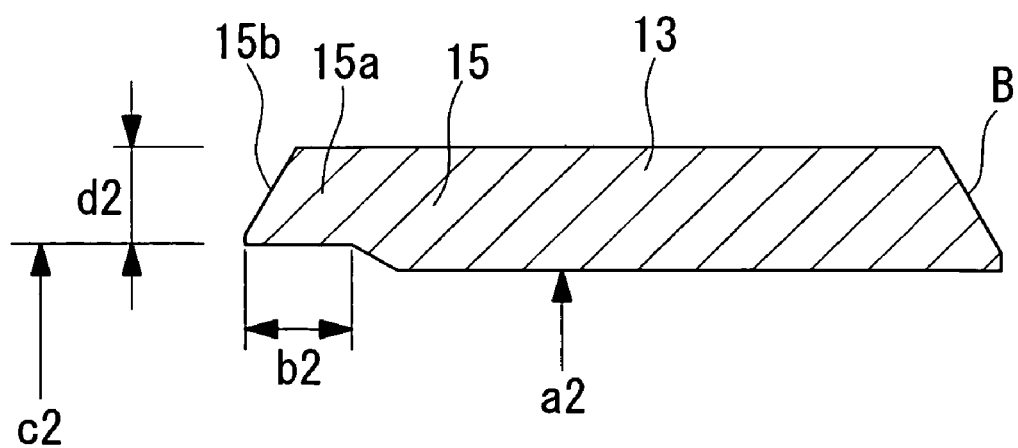
FIG. 3 is a sectional diagram in which a third tubing material (secondary tubing material) as shown in FIG. 1 is sectioned by a surface parallel to the lengthwise direction of the pipe.

FIG. 3 is a sectional diagram in which the third tubing material 13 is sectioned by a surface parallel to the lengthwise direction of the pipe 1 (refer to FIG. 1).

As shown in FIG. 3, the third tubular material 13 is formed such that its thickness is almost constant from the bevel B side towards the concave portion 15 side. That is, the inner diameter and outer diameter of the third tubular material 13 are formed to be almost the same measurements as the inner diameter and outer diameter of the first tubular material 11.

The concave portion 15 has an outer fitting portion 15a which protrudes along the outer peripheral surface of the third tubular material 13, and a bevel portion (second bevel) 15b having a V shaped bevel, for example, formed on the end face of the outer fitting portion 15a.

The outer fitting portion 15a is a transverse annular member formed such that it has a constant thickness (for example, d2=6.0 mm) around the whole circumference of the third tubular material 13, and the inner fitting portion 14a of the convex portion 14 is fitted on the radial inside (lower side of FIG. 3) of the outer fitting portion 15a. Furthermore, the tolerance of the radial distance c2 from the central axis of the third tubular material 13 to the radial inside of the outer fitting portion 15a is ±0.1 mm (refer to FIG. 18).

The second tubular material 12 and the third tubular material 13, described above, are joined by fitting the inner fitting portion 14a of the second tubular material 12 into the inside of the outer fitting portion 15a of the third tubular material 13, forming approximately V shaped cross-section bevels by the bevel 14b of the convex portion 14 and the bevel 15b of the concave portion 15, and butt welding the bevel portion formed in the approximately V shaped cross-section, using a method of inert gas welding from the outer peripheral surface side of the tubular materials 12 and 13 (refer to FIG. 1).

When the inner fitting portion 14a of the second tubular material 12 and the outer fitting portion 15a of the third tubular material 13 are fitted together, the internal edge of the V shaped cross-section bevels formed by the bevel 14b of the convex portion 14 and the bevel 15b of the concave portion 15 is closed (sealed) by the outer peripheral surface of the inner fitting portion 14a, and there is a gap of 1.0 mm to 1.6 mm between the outer peripheral surface of the inner fitting portion 14a and the inner peripheral surface of the outer fitting portion 15a.

If the welding is performed in a state in which the gap is maintained, it is possible to prevent the internal edge of the weld zone W from being exposed to the inside of the tube, and it is possible to prevent oxidized scale from occurring on the internal edge of the weld zone W.

That is, according to the piping joint structure 10 of the present embodiment, it is possible to eliminate back shielding at the time of welding, and furthermore it is possible to prevent oxidized scale from occurring in the tube.

Since the back shielding can be eliminated, inert gas, a large amount of which is conventionally required in order to perform back shielding, is not necessary, which enables the cost to be reduced.

Furthermore, since oxidized scale can be prevented from occurring in the tube, flushing operations and hammering operations, which are conventionally required in order to eliminate oxidized scale that occurs in the tube, are not necessary, which enables the durations of construction, installation, and repair to be shortened significantly.

Furthermore, since oxidized scale can be prevented from occurring in the tube, it is possible to reliably prevent accidents in which oxidized scale contaminates a bearing such as in a power turbine provided on the downstream side, for example, thus damaging the bearing.

Moreover, since the outer diameters of the first tubular material 11, the second tubular material 12, and the third tubular material 13, are almost the same, that is, the outer peripheral surface of the pipe 1 is formed with almost the same surface, it is possible to tidy the external visual appearance, thus enabling an aesthetic improvement.

Furthermore, the second tubular material 12 is formed such that its thickness increases gradually from the bevel B side towards the convex portion 14. Moreover, as shown in FIG. 1, since fluid flows from the bevel B side of the second tubular material 12 towards the convex portion 14, impurities such as waste and the like do not accumulate inside the pipe 1, and therefore it is possible for the fluid to flow smoothly.

Furthermore, the second tubular material 12 can be made using a commercial JIS standard tubular material. That is, in the case where the first tubular material 11 and the third tubular material 13 are schedule 40 tubular material (6.0 mm thickness) of nominal diameter 100 mm (4 inches) for example, it is possible to make the second tubular material 12 easily by processing (cutting the inner peripheral surface and two end faces of the tubular material) schedule 80 tubular material (8.6 mm thickness) of nominal diameter 100 mm (4 inches).

Moreover, since the thickness of the inner fitting portion 14a is set to between 3.0 mm and 3.5 mm, it is possible to prevent burnt remains due to welding from forming on the inner peripheral surface side of the pipe 1.

A second embodiment of a piping joint structure according to the present invention will be described using FIG. 4 through to FIG. 6.

Figure 4:
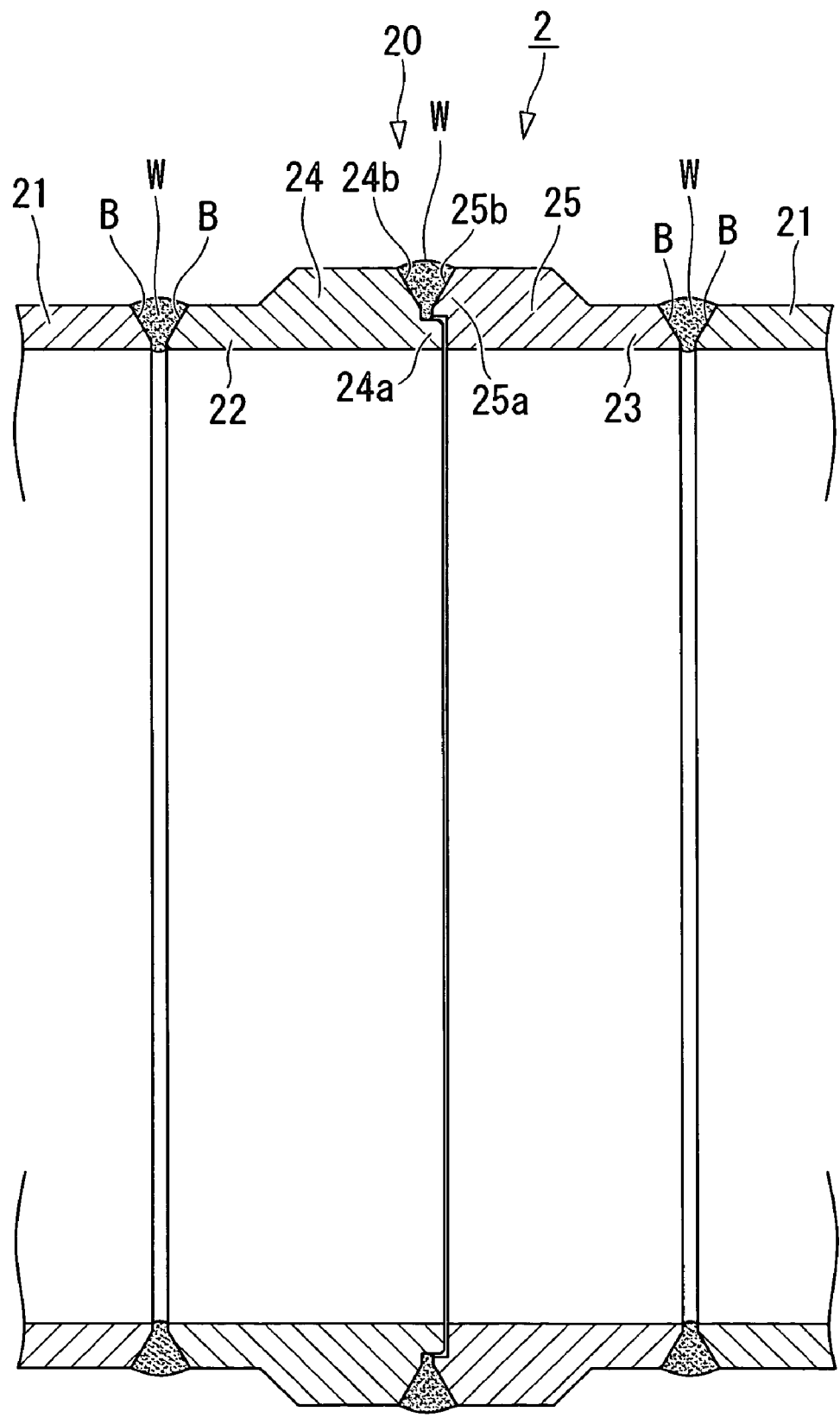
FIG. 4 is a development drawing in which a lubricating oil pipe for a power turbine containing a second embodiment of a piping joint structure according to the present invention is sectioned by a surface parallel to the lengthwise direction of the pipe and expanded.

FIG. 4 is a development drawing in which a pipe 2 having a piping joint structure 20 according to the present invention is sectioned by a surface parallel to the lengthwise direction of the pipe 2.

The pipe 2 comprises a first tubular material 21, a second tubular material (primary tubular material) 22, and a third tubular material (secondary tubular material) 23 as its main elements. A piping joint structure 20 is provided between the second tubular material 22 and the third tubular material 23.

The first tubular material 21 is a stainless steel tubular material whose thickness is almost uniform throughout, and in which V shaped bevels B, for example, are formed on the faces of its two ends.

The second tubular material 22 is a stainless steel tubular material in which a V shaped bevel B, for example, is formed on the end face at the side facing the first tubular material 21, and a convex portion 24 of the piping joint structure 20 is formed on the opposite end (end at the side facing the third tubular material 23).

The third tubular material 23 is a stainless steel tubular material in which a concave portion 25 of the piping joint structure 20 is formed on the end at the side facing the second tubular material 22, and a V shaped bevel B, for example, is formed on the end face on the opposite side to the end face (end face at the side facing the first tubular material 21).

Figure 5:
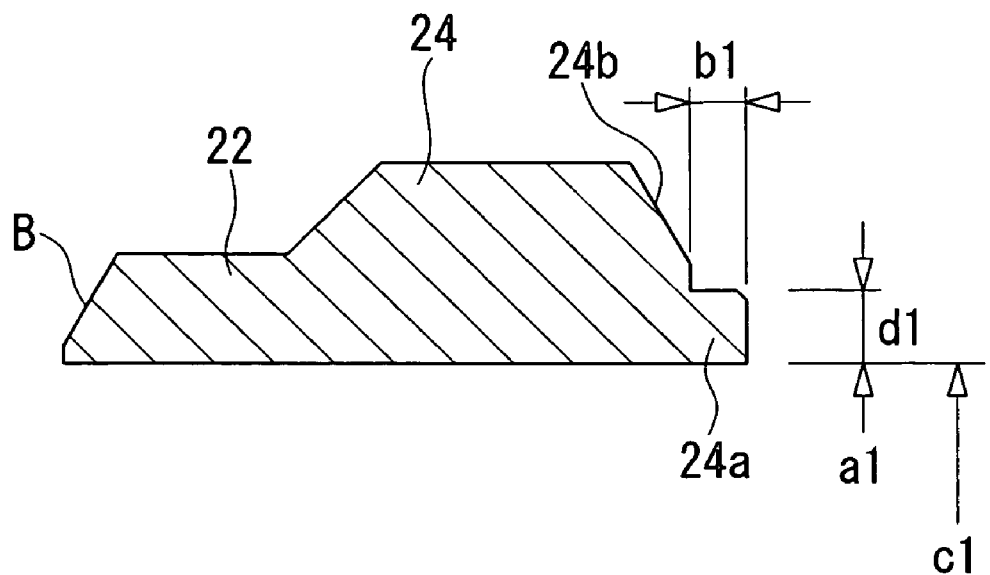
FIG. 5 is a sectional diagram in which a second tubing material (primary tubing material) as shown in FIG. 4 is sectioned by a surface parallel to the lengthwise direction of the pipe.

FIG. 5 is a sectional diagram in which the second tubing material 22 is sectioned by a surface parallel to the lengthwise direction of the pipe 2 (refer to FIG. 4).

As shown in FIG. 5, the part other than the convex portion 24 of the second tubular material 22 is formed such that its thickness is almost constant from the bevel B side towards the convex portion 24. That is, the inner diameter and outer diameter of the second tubular material 22 are formed to be almost the same measurements as the inner diameter and outer diameter of the first tubular material 21.

On the other hand, the convex portion 24 of the second tubular material 22 is formed such that its inner diameter is almost the same measurement as that of the first tubular material 21, and its outer diameter is larger than the outer diameter of the first tubular material 21.

The convex portion 24 has an inner fitting portion 24a which protrudes from the end face of the radial inside along the inner peripheral surface of the second tubular material 22, and a bevel portion (first bevel) 24b having a V shaped bevel, for example, formed on the end face of the radial outside.

The inner fitting portion 24a is a transverse annular member, formed such that it has a constant thickness (preferably greater than or equal to d1=3.5 mm) around the whole circumference of the second tubular material 22, and the outer fitting portion 25a of the concave portion 25 of the third tubular material 23 is fitted on the radial outside (upper side of FIG. 5) of the inner fitting portion 24a. Furthermore, the tolerance of the radial distance c1 from the central axis of the second tubular material 22 to the radial outside of the inner fitting portion 24a is ±0.1 mm (refer to FIG. 17).

Figure 6:
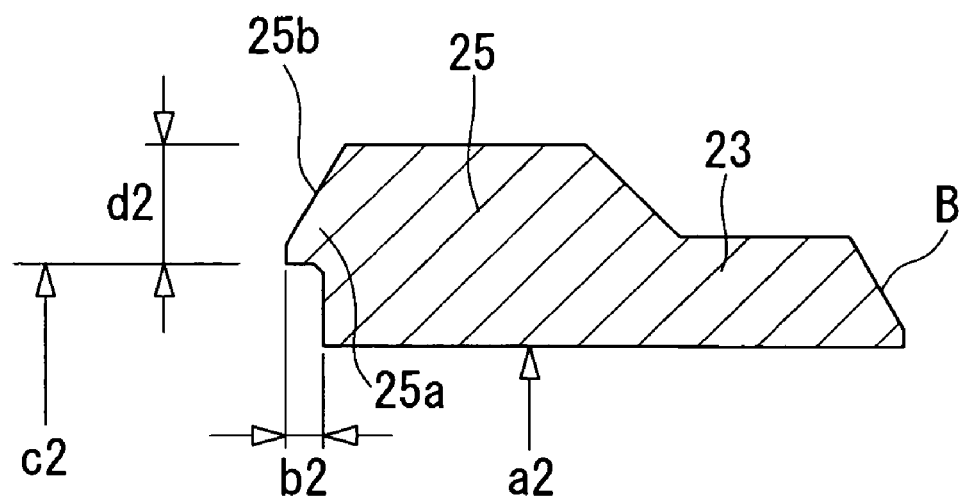
FIG. 6 is a sectional diagram in which a third tubing material (secondary tubing material) as shown in FIG. 4 is sectioned by a surface parallel to the lengthwise direction of the pipe.

FIG. 6 is a sectional diagram in which the third tubing material 23 is sectioned by a surface parallel to the lengthwise direction of the pipe 2 (refer to FIG. 4).

As shown in FIG. 6, the part other than the concave portion 25 of the third tubular material 23 is formed such that its thickness is almost constant from the bevel B side towards the concave portion 25. That is, the inner diameter and outer diameter of the third tubular material 23 are formed to be almost the same measurements as the inner diameter and outer diameter of the first tubular material 21.

On the other hand, the concave portion 25 of the third tubular material 23 is formed such that its inner diameter is almost the same measurement as that of the first tubular material 21, and its outer diameter is larger than the outer diameter of the first tubular material 21.

The concave portion 25 has an outer fitting portion 25a which protrudes along the outer peripheral surface of the third tubular material 23, and a bevel portion (second bevel) 25b having a V shaped bevel, for example, formed on the end face of the outer fitting portion 25a.

The outer fitting portion 25a is a transverse annular member, formed such that it has a constant thickness (for example, d2=7.0 mm) around the whole circumference of the third tubular material 23, and the inner fitting portion 24a of the convex portion 24 is fitted on the radial inside (lower side of FIG. 6) of the outer fitting portion 25a. Furthermore, the tolerance of the radial distance c2 from the central axis of the third tubular material 23 to the radial outside of the outer fitting portion 25a is ±0.1 mm (refer to FIG. 18).

The second tubular material 22 and the third tubular material 23, described above, are joined by fitting the inner fitting portion 24a of the second tubular material 22 into the inside of the outer fitting portion 25a of the third tubular material 23, forming approximately V shaped cross-section bevels by the bevel 24b of the convex portion 24 and the bevel 25b of the concave portion 25, and butt welding the bevel portion formed in the approximately V shaped cross-section, using a method of inert gas welding from the outer peripheral surface side of the tubular materials 22 and 23 (refer to FIG. 4).

When the inner fitting portion 24a of the second tubular material 22 and the outer fitting portion 25a of the third tubular material 23 are fitted together, the internal edge of the V shaped cross-section bevels formed by the bevel 24b of the convex portion 24 and the bevel 25b of the concave portion 25 is closed (sealed) by the outer peripheral surface of the inner fitting portion 24a, and it is arranged such that there can be almost no gap between the outer peripheral surface of the inner fitting portion 24a and the inner peripheral surface of the outer fitting portion 25a.

If the welding is performed in a state in which the gap is maintained, it is possible to prevent the internal edge of the weld zone W from being exposed to the inside of the tube. Furthermore it is possible to prevent oxidized scale from occurring on the internal edge of the weld zone W.

That is, according to the piping joint structure 20 of the present embodiment, it is possible to eliminate back shielding at the time of welding, and it is possible to prevent oxidized scale from occurring in the tube.

Since the back shielding can be eliminated, inert gas, a large amount of which is conventionally required in order to perform back shielding, is not necessary, which enables the cost to be reduced.

Furthermore, since oxidized scale can be prevented from occurring in the tube, flushing operations and hammering operations, which are conventionally required in order to eliminate oxidized scale that occurs in the tube, are not necessary, which enables the durations of construction, installation, and repair to be shortened significantly.

Furthermore, since oxidized scale can be prevented from occurring in the tube, it is possible to reliably prevent accidents in which oxidized scale contaminates a bearing such as in a power turbine provided on the downstream side, for example, thus damaging the bearing.

Moreover, since the outer diameters of the first tubular material 21, the second tubular material 22, and the third tubular material 23, are almost the same, that is, the outer peripheral surface of the pipe 1 is formed with almost the same surface, whichever direction the fluid flows in, impurities such as waste and the like do not accumulate inside the pipe 2. Furthermore, it enables the fluid to flow more smoothly than in the above-described embodiment.

Moreover, since the thickness of the inner fitting portion 24a is set to 3.5 mm, it is possible to prevent burnt remains due to welding from forming on the inner peripheral surface side of the pipe 2.

A third embodiment of a piping joint structure according to the present invention will be described using FIG. 7 through to FIG. 9.

Figure 7:
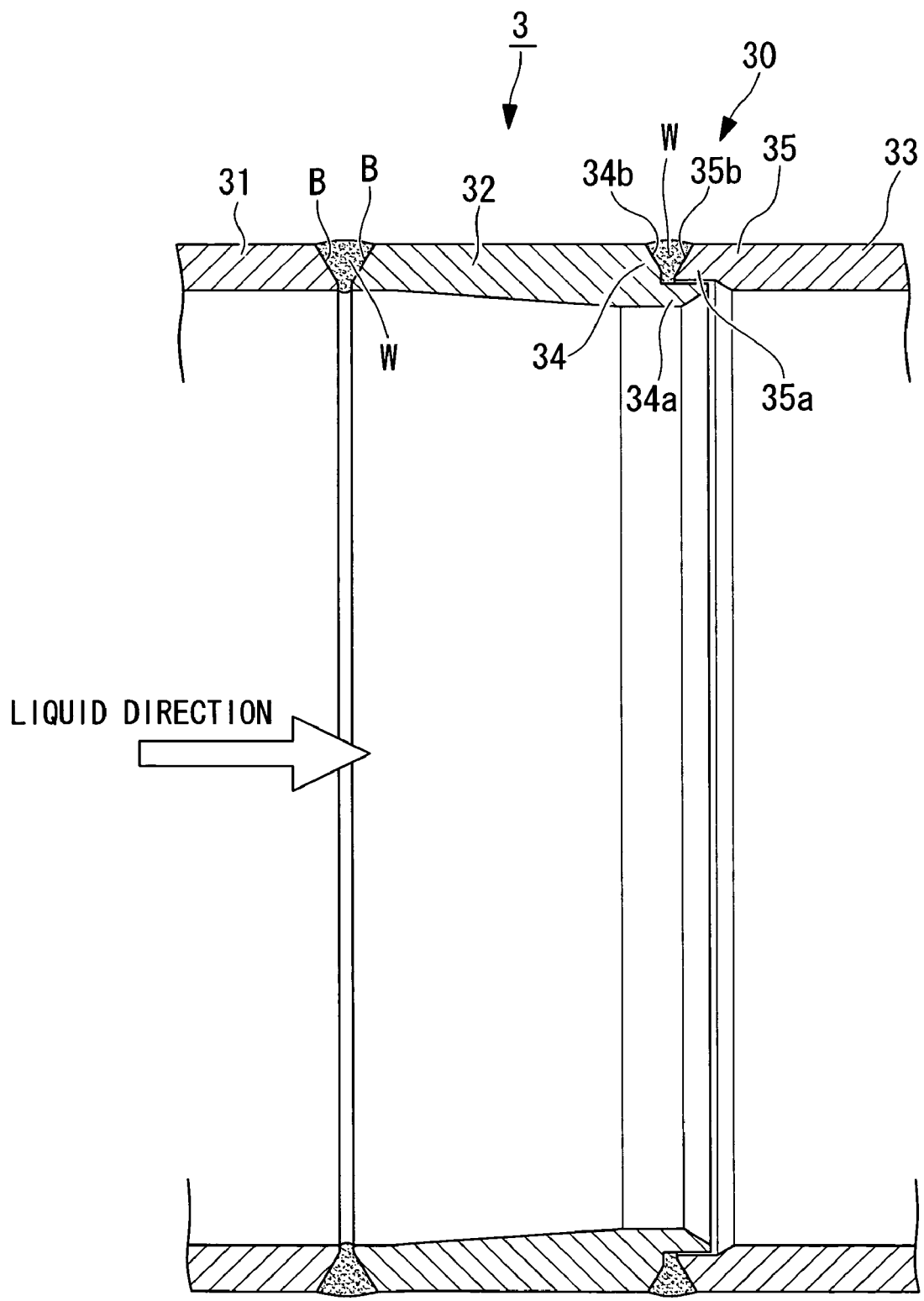
FIG. 7 is a development drawing in which a lubricating oil pipe for a power turbine containing a third embodiment of a piping joint structure according to the present invention is sectioned by a surface parallel to the lengthwise direction of the pipe and expanded.

FIG. 7 is a development drawing in which a pipe 3 having a piping joint structure 30 according to the present invention is sectioned by a surface parallel to the lengthwise direction of the pipe 3.

The pipe 3 comprises a first tubular material 31, a second tubular material (primary tubular material) 32, and a third tubular material (secondary tubular material) 33 as its main elements. A piping joint structure 30 is provided between the second tubular material 32 and the third tubular material 33.

The first tubular material 31 is a stainless steel tubular material whose thickness is almost uniform throughout, and in which V shaped bevels B, for example, are formed on the faces of its two ends.

The second tubular material 32 is a stainless steel tubular material in which a V shaped bevel B, for example, is formed on the end face at the side facing the first tubular material 31, and a convex portion 34 of the piping joint structure 30 is formed on the opposite end (end at the side facing the third tubular material 33).

The third tubular material 33 is a stainless steel tubular material in which a concave portion 35 of the piping joint structure 30 is formed on the end at the side facing the second tubular material 32, and a V shaped bevel B, for example, is formed on the end face on the opposite side to the end face (end face at the side facing the first tubular material 31).

Figure 8:
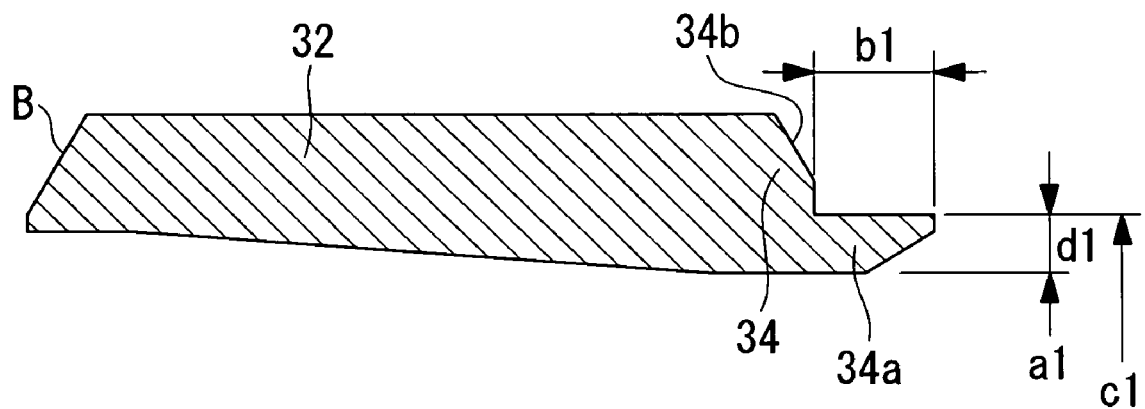
FIG. 8 is a sectional diagram in which a second tubing material (primary tubing material) as shown in FIG. 7 is sectioned by a surface parallel to the lengthwise direction of the pipe.

FIG. 8 is a sectional diagram in which the second tubing material 32 is sectioned by a surface parallel to the lengthwise direction of the pipe 3 (refer to FIG. 7).

As shown in FIG. 8, the second tubular material 32 is formed such that its thickness increases gradually from the bevel B side towards the convex portion 34. That is, the second tubular material 32 is produced such that its inner diameter decreases gradually from the bevel B side towards the convex portion 34, and its outer diameter maintains almost the same measurement as the outer diameter of the first tubular material 31 from the bevel B side towards the convex portion 34.

The convex portion 34 has an inner fitting portion 34a which protrudes from the end face of the radial inside along the inner peripheral surface of the second tubular material 32, and a bevel portion (first bevel) 34b having a V shaped bevel, for example, formed on the end face of the radial outside.

The inner fitting portion 34a is a transverse annular member, formed such that it has a uniform thickness (preferably greater than or equal to d1=3.5 mm) around the whole circumference of the second tubular material 32, and the outer fitting portion 35a of the concave portion 35 is fitted on the radial outside of the inner fitting portion 34a. Furthermore, the tolerance of the radial distance c1 from the central axis of the second tubular material 32 to the radial outside of the inner fitting portion 34a is ±0.1 mm (refer to FIG. 17).

The inner fitting portion 34a is extended further in the lengthwise direction of the second tubular material 32 such that its tip surface is located further towards the proximal end side (root side) of the concave portion 35 (that is, such that there is a greater overlapping part between the inner fitting portion 34a and the outer fitting portion 35a) than in the first embodiment described using FIG. 1, FIG. 2 and FIG. 3.

Figure 9:
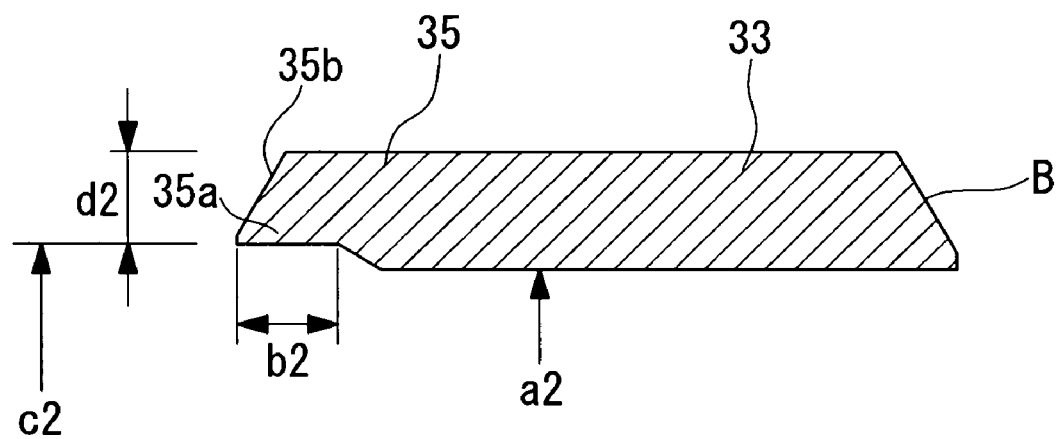
FIG. 9 is a sectional diagram in which a third tubing material (secondary tubing material) as shown in FIG. 7 is sectioned by a surface parallel to the lengthwise direction of the pipe.

FIG. 9 is a sectional diagram in which the third tubing material 33 is sectioned by a surface parallel to the lengthwise direction of the pipe 3 (refer to FIG. 7).

As shown in FIG. 9, the third tubular material 33 is formed such that its thickness is almost constant from the bevel B side towards the concave portion 35 side. That is, the inner diameter and outer diameter of the third tubular material 33 are formed to be almost the same measurements as the inner diameter and outer diameter of the first tubular material 31.

The concave portion 35 has an outer fitting portion 35a which protrudes along the outer peripheral surface of the third tubular material 33, and a bevel portion (second bevel) 35b having a V shaped bevel, for example, formed on the end face of the outer fitting portion 35a.

The outer fitting portion 35a is a transverse annular member, formed such that it has a constant thickness (for example, d2=6.0 mm) around the whole circumference of the third tubular material 33, and the inner fitting portion 34a of the convex portion 34 is fitted on the radial inside of the outer fitting portion 35a. Furthermore, the tolerance of the radial distance c2 from the central axis of the third tubular material 33 to the radial inside of the outer fitting portion 35a is ±0.1 mm (refer to FIG. 18).

The second tubular material 32 and the third tubular material 33, described above, are joined by fitting the inner fitting portion 34a of the second tubular material 32 into the inside of the outer fitting portion 35a of the third tubular material 33, forming approximately V shaped cross-section bevels by the bevel 34b of the convex portion 34 and the bevel 35b of the concave portion 35, and butt welding the bevel portion formed in the approximately V shaped cross-section, using a method of inert gas welding from the outer peripheral surface side of the tubular materials 32 and 33.

When the inner fitting portion 34a of the second tubular material 32 and the outer fitting portion 35a of the third tubular material 33 are fitted together, the internal edge of the V shaped cross-section bevels formed by the bevel 34b of the convex portion 34 and the bevel 35b of the concave portion 35 is closed (sealed) by the outer peripheral surface of the inner fitting portion 34, and there is a gap of 1.0 mm to 1.6 mm between the outer peripheral surface of the inner fitting portion 34a and the inner peripheral surface of the outer fitting portion 35a.

If the welding is performed in this state, it is possible to prevent the internal edge of the weld zone W from being exposed to the inside of the tube. Furthermore it is possible to prevent oxidized scale from occurring on the internal edge of the weld zone W.

That is, according to the piping joint structure 30 of the present embodiment, it is possible to eliminate back shielding at the time of welding, and it is possible to prevent oxidized scale from occurring in the tube.

Since the back shielding can be eliminated, inert gas, a large amount of which is conventionally required in order to perform back shielding, is not necessary, which enables the cost to be reduced.

Furthermore, since oxidized scale can be prevented from occurring in the tube, flushing operations and hammering operations, which are conventionally required in order to eliminate oxidized scale that occurs in the tube, are not necessary, which enables the durations of construction, installation, and repair to be shortened significantly.

Furthermore, since oxidized scale can be prevented from occurring in the tube, it is possible to reliably prevent accidents in which oxidized scale contaminates a bearing such as in a power turbine provided on the downstream side, for example, thus damaging the bearing.

Moreover, since the outer diameters of the first tubular material 31, the second tubular material 32, and the third tubular material 33, are almost the same, that is, the outer peripheral surface of the pipe 3 is formed with almost the same surface, it is possible to tidy the external visual appearance, thus enabling an aesthetic improvement.

Furthermore, the second tubular material 32 is formed such that its thickness increases gradually from the bevel B side towards the convex portion 34. Moreover, as shown in FIG. 7, since fluid flows from the bevel B side of the second tubular material 32 towards the convex portion 34, impurities such as waste and the like do not accumulate inside the pipe 1, and therefore it is possible for the fluid to flow smoothly.

Moreover, since the inner fitting portion 34 is formed such that the tip surface of the inner fitting portion 34a is located further towards the proximal end side (root side) of the concave portion 35 (that is, such that there is a greater overlapping part between the inner fitting portion 34a and the outer fitting portion 35a) than in the embodiment described using FIG. 1, FIG. 2 and FIG. 3, it is possible to reduce voids between the inner fitting portion 34 and the outer fitting portion 35a, enabling impurities such as waste and the like accumulating inside the pipe 3 to be lower than in the first embodiment.

Furthermore, the second tubular material 32 can be made using a commercial JIS standard tubular material. That is, in the case where the first tubular material 31 and the third tubular material 33 are schedule 40 tubular material (6.0 mm thickness) of nominal diameter 100 mm (4 inches) for example, it is possible to make the second tubular material 32 easily by processing (cutting the inner peripheral surface and two end faces of the tubular material) schedule 80 tubular material (8.6 mm thickness) of nominal diameter 100 mm (4 inches).

Moreover, since the thickness of the inner fitting portion 34a is set to between 3.0 mm and 3.5 mm, it is possible to prevent burnt remains due to welding from forming on the inner peripheral surface side of the pipe 3.

A fourth embodiment of a piping joint structure according to the present invention will be described using FIG. 10 through to FIG. 12.

Figure 10:
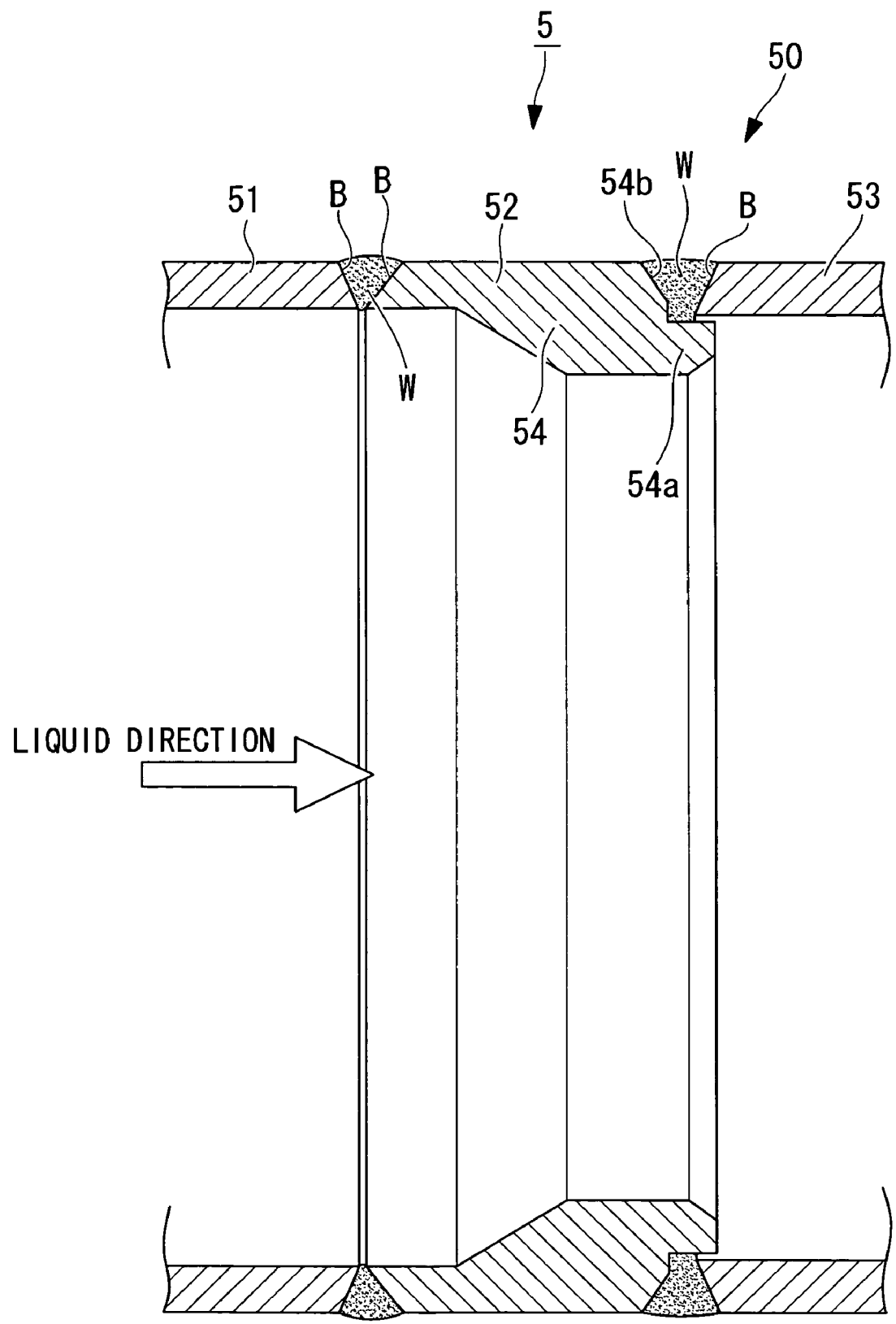
FIG. 10 is a development drawing in which a lubricating oil pipe for a power turbine containing a fourth embodiment of a piping joint structure according to the present invention is sectioned by a surface parallel to the lengthwise direction of the pipe and expanded.

FIG. 10 is a development drawing in which a pipe 5 having a piping joint structure 50 according to the present invention is sectioned by a surface parallel to the lengthwise direction of the pipe 5.

The pipe 5 comprises a first tubular material 51, a second tubular material (primary tubular material) 52, and a third tubular material (secondary tubular material) 53 as its main elements. The piping joint structure 50 is provided between the second tubular material 52 and the third tubular material 53.

The first tubular material 51 is a stainless steel tubular material whose thickness is almost uniform throughout, and in which V shaped bevels B, for example, are formed on the faces of its two ends.

The second tubular material 52 is a stainless steel tubular material in which a V shaped bevel B, for example, is formed on the end face at the side facing the first tubular material 51, and a convex portion 54 of the piping joint structure 50 is formed on the opposite end (end at the side facing the third tubular material 53).

The third tubular material 53 is a stainless steel tubular material whose thickness is almost uniform throughout, and in which V shaped bevels B, for example, are formed on the faces of its two ends.

Figure 11:
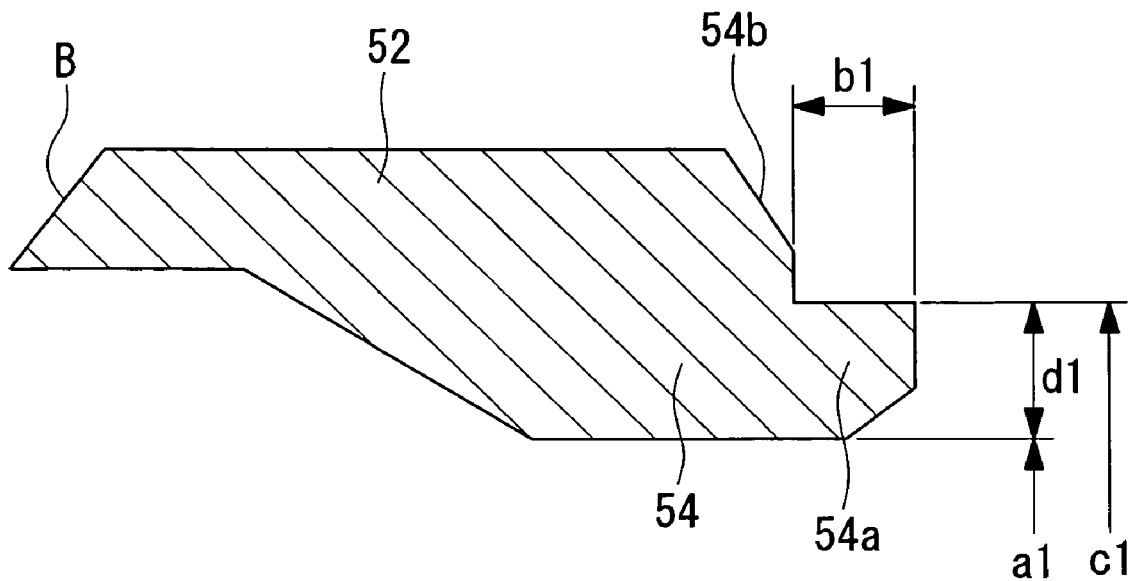
FIG. 11 is a sectional diagram in which a second tubing material (primary tubing material) as shown in FIG. 10 is sectioned by a surface parallel to the lengthwise direction of the pipe.

FIG. 11 is a sectional diagram in which the second tubing material 52 is sectioned by a surface parallel to the lengthwise direction of the pipe 5 (refer to FIG. 10).

As shown in FIG. 11, the part other than the convex portion 54 of the second tubular material 52 is formed such that its thickness is almost constant from the bevel B side towards the convex portion 54. That is, the inner diameter and outer diameter of the second tubular material 52 are formed to be almost the same measurements as the inner diameter and outer diameter of the first tubular material 51.

On the other hand, the convex portion 54 of the second tubular material 52 is formed such that its outer diameter is almost the same measurement as those of the first tubular material 51 and the third tubular material 53, and its inner diameter is shorter than the inner diameters of the first tubular material 51 and the third tubular material 53.

The inner peripheral surface of the part other than the convex portion 54 of the second tubular material 52 and the inner peripheral surface of the concave portion 54 of the second tubular material 52 are connected by an inclined surface (angle of 4° to 6°), with a gradual (gentle) slope.

The convex portion 54 has an inner fitting portion 54a which protrudes from the end face on the radial inside along the inner peripheral surface of the second tubular material 52, and a bevel portion (first bevel) 54b having a V shaped bevel, for example, formed on the end face on the radial outside.

The inner fitting portion 54a is a transverse annular member, formed such that it has a constant thickness (preferably greater than or equal to d1=3.5 mm) around the whole circumference of the second tubular material 52, and one end of the third tubular material 53 is fitted on the radial outside of the inner fitting portion 54a. Furthermore, the tolerance of the radial distance c1 from the central axis of the second tubular material 52 to the radial outside of the inner fitting portion 54a is ±0.1 mm (refer to FIG. 17).

Figure 12:
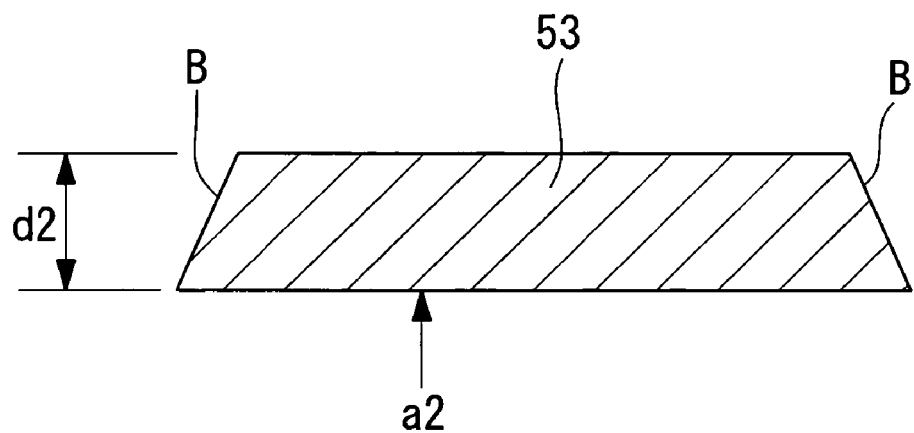
FIG. 12 is a sectional diagram in which a third tubing material (secondary tubing material) as shown in FIG. 10 is sectioned by a surface parallel to the lengthwise direction of the pipe.

FIG. 12 is a sectional diagram in which the third tubing material 53 is sectioned by a surface parallel to the lengthwise direction of the pipe 5 (refer to FIG. 10).

As shown in FIG. 12, the tolerance of the radial distance a2 from the central axis of the third tubular material 53 to the inner peripheral surface is ±0.1 mm (refer to FIG. 18).

The second tubular material 52 and the third tubular material 53, described above, are joined by fitting the inner fitting portion 54a of the second tubular material 52 into the inside of one end of the third tubular material 53, forming approximately V shaped cross-section bevels by the bevel 54b of the convex portion 54 and the bevel B of the third tubular material 53, and butt welding the bevel portion, which is formed in the approximately V shaped cross-section, using a method of inert gas welding from the outer peripheral surface side of the tubular materials 52 and 53.

When the inner fitting portion 54a of the second tubular material 52 and the one end of the third tubular material 53 are fitted together, the internal edge of the V shaped cross-section bevels formed by the bevel 54b of the convex portion 54 and the bevel B of the third tubular material 53 is closed (sealed) by the outer peripheral surface of the inner fitting portion 54a, and it is arranged such that there can be almost no gap between the outer peripheral surface of the inner fitting portion 54a and the inner peripheral surface of the one end of the third tubular material 53.

If the welding is performed in this state, it is possible to prevent the internal edge of the weld zone W from being exposed to the inside of the tube. Furthermore it is possible to prevent oxidized scale from occurring on the internal edge of the weld zone W.

That is, according to the piping joint structure 50 of the present embodiment, it is possible to eliminate back shielding at the time of welding, and it is possible to prevent oxidized scale from occurring in the tube.

Since the back shielding can be eliminated, inert gas, a large amount of which is conventionally required in order to perform back shielding, is not necessary, which enables the cost to be reduced.

Furthermore, since oxidized scale can be prevented from occurring in the tube, flushing operations and hammering operations, which are conventionally required in order to eliminate oxidized scale that occurs in the tube, are not necessary, which enables the durations of construction, installation, and repair to be shortened significantly.

Furthermore, since oxidized scale can be prevented from occurring in the tube, it is possible to reliably prevent accidents in which oxidized scale contaminates a bearing such as in a power turbine provided on the downstream side, for example, thus damaging the bearing.

Moreover, since the outer diameters of the first tubular material 51, the second tubular material 52, and the third tubular material 53, are almost the same, that is, the outer peripheral surface of the pipe 5 is formed with almost the same surface, it is possible to tidy the external visual appearance, which enables aesthetic improvement.

Furthermore, the second tubular material 52 can be made using a commercial JIS standard tubular material. That is, in the case where the first tubular material 51 and the third tubular material 53 are schedule 40 tubular material (6.0 mm thickness) of nominal diameter 100 mm (4 inches) for example, it is possible to make the second tubular material 52 easily by processing (cutting the inner peripheral surface and two end faces of the tubular material) schedule 80 tubular material (8.6 mm thickness) of nominal diameter 100 mm (4 inches).

Moreover, since it is not necessary to provide the outer fitting portions 15a and 35a described in the first embodiment and the third embodiment on one end (the end at the side facing the convex portion 54 of the second tubular material 52) of the third tubular material 53, it enables the time and cost required for processing the third tubular material 53 to be reduced.

Furthermore, since the inner peripheral surface of the part other than the convex portion 54 of the second tubular material 52 and the inner peripheral surface of the concave portion 54 of the second tubular material 52 are connected by an inclined surface (angle of 4° to 6°), with a gradual slope, and, as shown in FIG. 10, the fluid flows from the bevel B side of the second tubular material 52 towards the convex portion 54, it is possible to reduce the resistance of the fluid path inside the tube more than in the case of the structure of embodiment 1 or 3, and it is possible for the fluid in the tube to flow more smoothly. Therefore impurities such as waste and the like do not accumulate inside the pipe 5, which enables the fluid to flow smoothly.

Moreover, since the thickness of the inner fitting portion 54a is set to 3.5 mm, it is possible to prevent burnt remains due to welding from forming on the inner peripheral surface side of the pipe 5.

Figure 13:
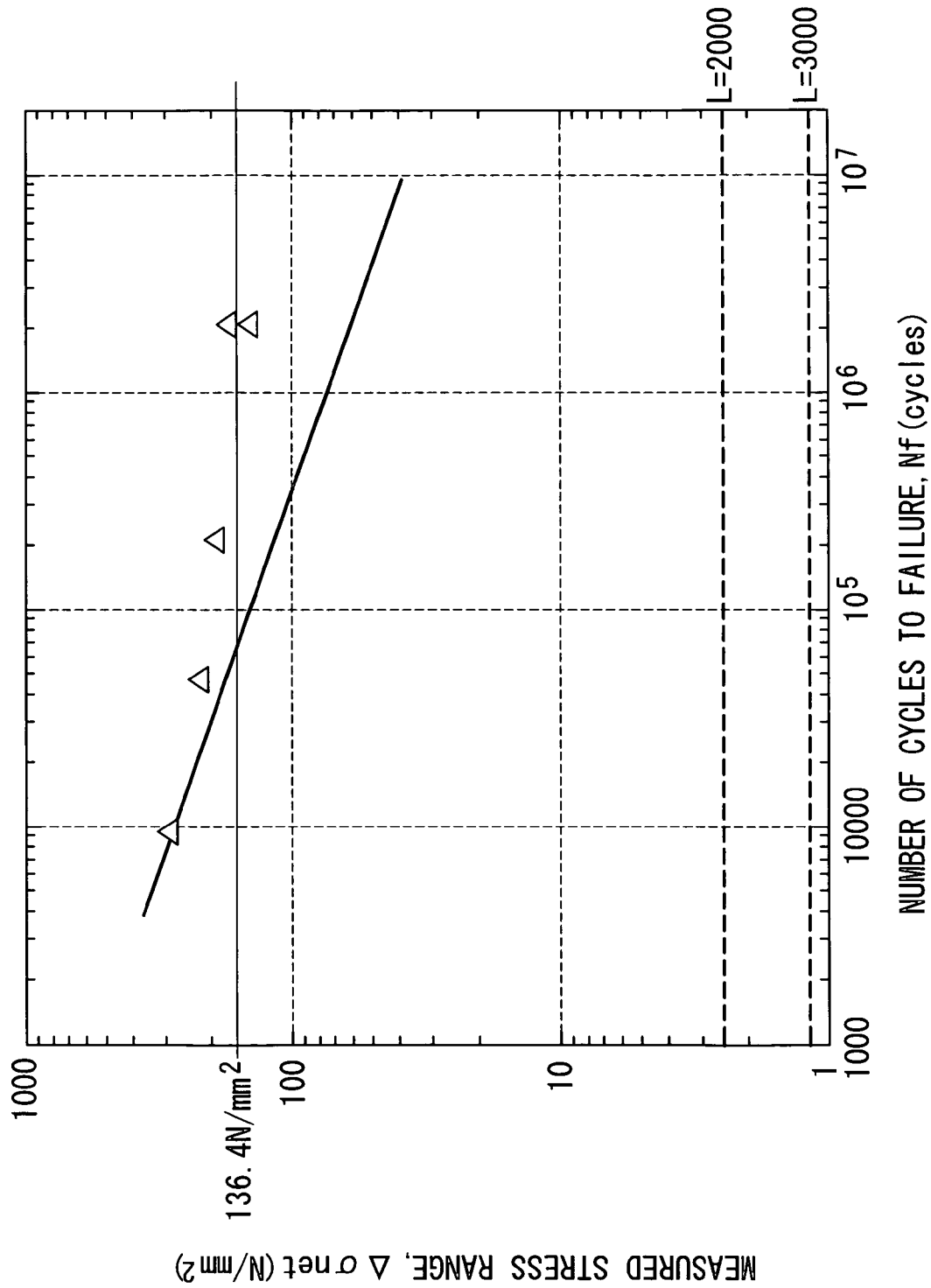
FIG. 13 is a graph showing the results of a fatigue test of the pipe shown in FIG. 10 performed by cutting out a shape as shown in FIG. 14A and FIG. 14B, and fitting it in a fatigue testing machine.

FIG. 13 is a graph showing the results of a fatigue test of the pipe 5 described in the fourth embodiment, performed by cutting out a shape as shown in FIG. 14A and FIG. 14B and fitting it in a fatigue testing machine. The test is performed by a partially pulsating tensile fatigue test.

As shown in FIG. 13, in the case where the span distances of the pipes are 2000 mm and 3000 mm, which are typical spans in real situations, stresses of 2.6 N/mm$^2$ and 1.2 N/mm$^2$, respectively, can be considered to occur using a double end supported beam centered weight model calculation. If the fatigue limit in a real situation is 10$^7$ times, the nominal stress of the pipe 5 $\Delta\sigma$=136.4 N/mm$^2$, which shows that the pipe 5 has a fatigue strength of greater than or equal to the real situation stress condition.

In the above-mentioned present embodiment, the bevels B of the first tubular materials 11, 21, 31 and 51, and the bevels B of the second tubular materials 12, 22, 32 and 52, respectively, and the bevel B of the first tubular material 21 and the bevel B of the third tubular material 23, are joined by butt welding the bevel portions, which are formed in approximately V shaped cross-sections by the bevels B and the bevels B, using a method of inert gas welding from the outer peripheral surface side.

However, the present invention is not limited to this. It is also possible to join the first tubular materials 11, 21, 31 and 51, and the second tubular materials 12, 22, 32, and 52, respectively, and the first tubular material 21 and the third tubular material 23, by the above-mentioned piping joint structures 10, 20, 30 and 50.

Figure 15:
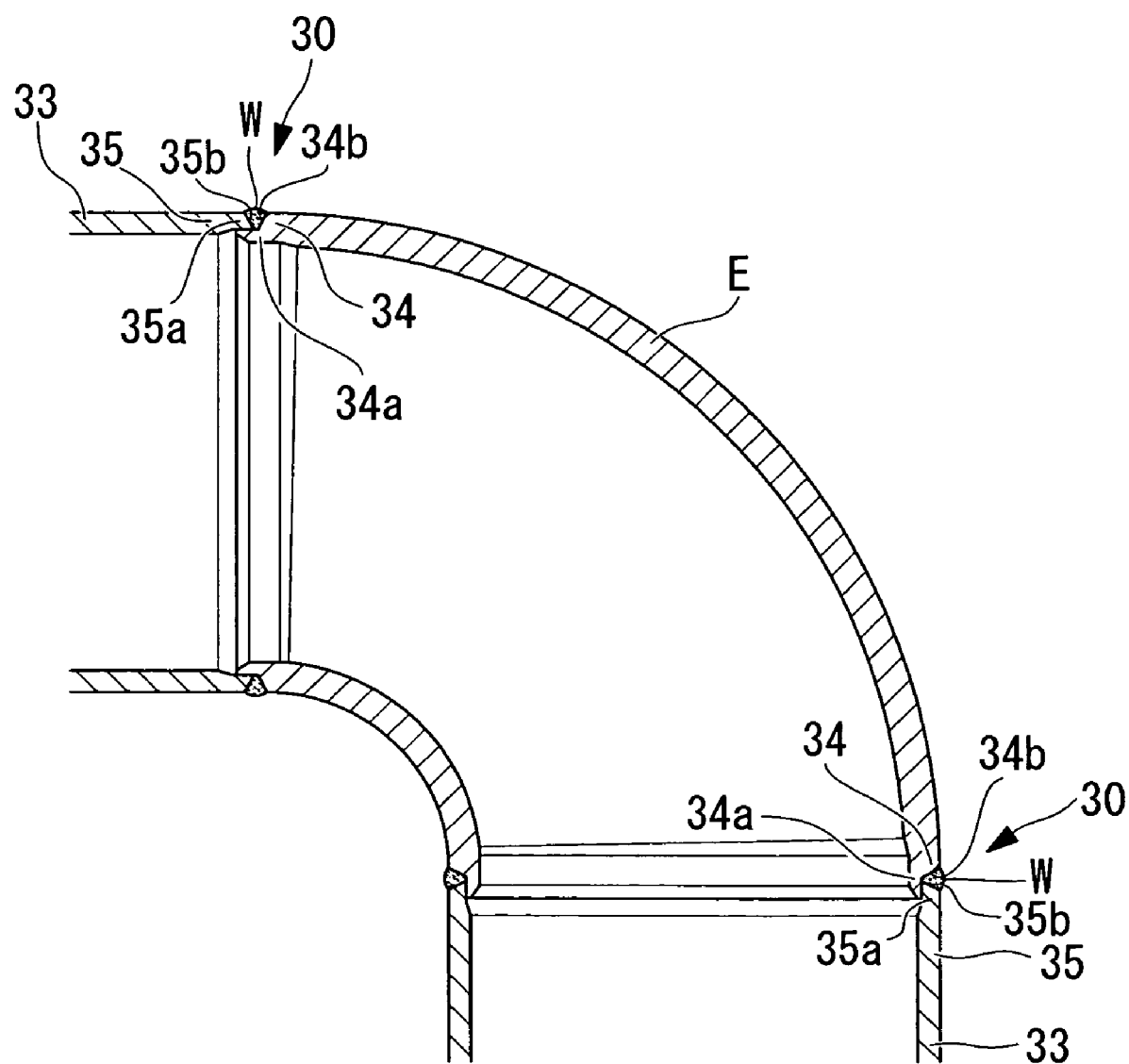
FIG. 15 is a sectional diagram to explain an example in which the piping joint structure as shown in FIG. 7 is utilized in order to join an elbow tube and straight tubes.
Figure 16:
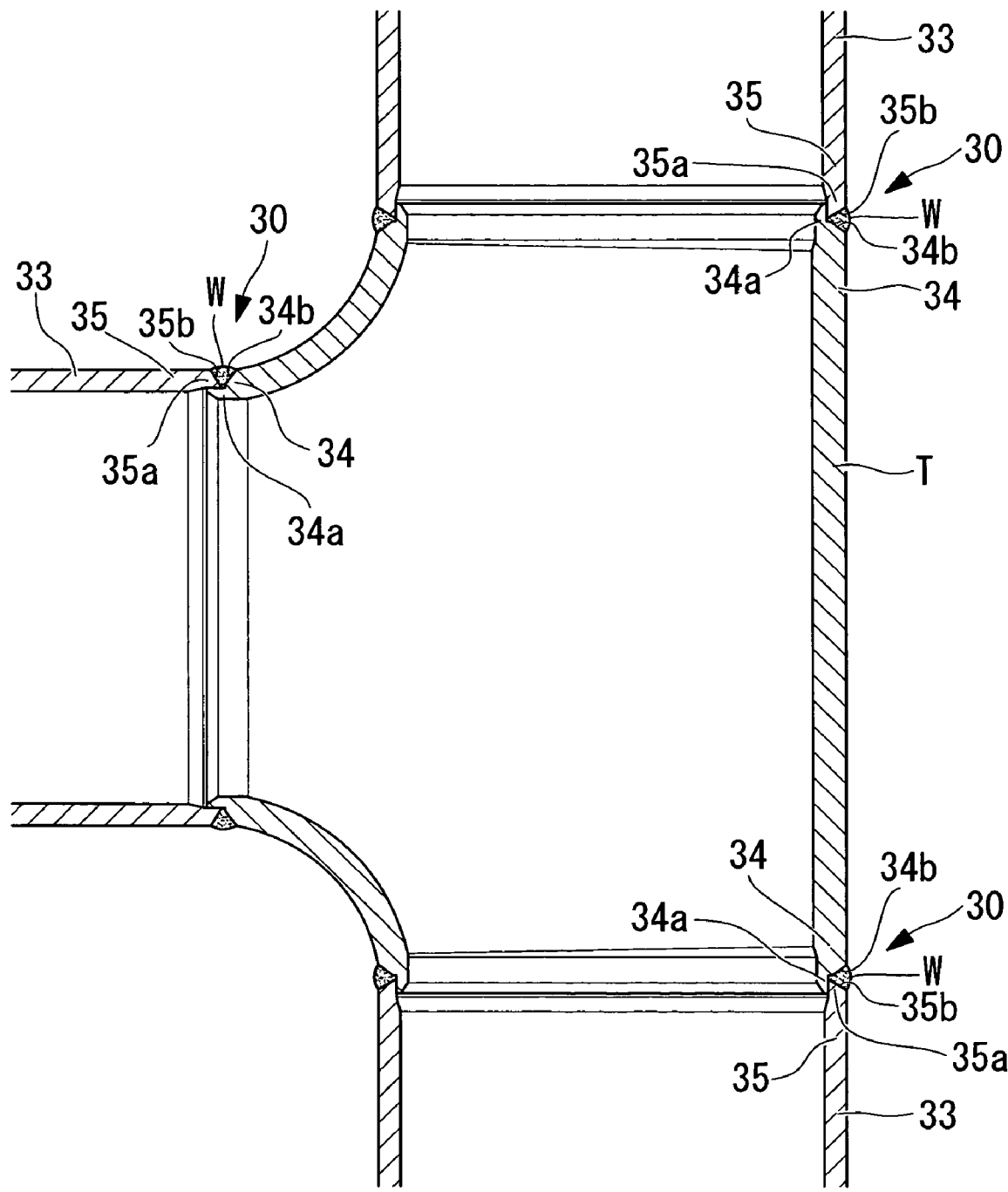
FIG. 16 is a sectional diagram to explain an example in which the piping joint structure as shown in FIG. 7 is utilized in order to join a T tube and straight tubes.

Furthermore, the present invention can be applied not only to joining straight tubular materials (straight tubes), but it is also possible to join an elbow tube E, as shown in FIG. 15, and the above-mentioned third tubular material 33, or to join a T-type tube T, as shown in FIG. 16, and the above-mentioned third tubular material 33, using the piping joint structure 30, for example.

Moreover, in the case where the piping joint structure 10 shown in FIG. 1, the piping joint structure 30 shown in FIG. 7, or the piping joint structure 50 shown in FIG. 10, is used, it is desirable to set the direction of the fluid flow to be the direction indicated by the outline arrows in the figures.

By so doing, it is possible for the fluid to flow smoothly along the inner peripheral surfaces of the pipes 1, 3 and 5, as well as being possible to prevent impurities such as waste and the like from accumulating on the end faces (end faces at the right side in the figure) of the inner fitting portions 14a, 34a and 54a.

It is further desirable for the construction to be such that the first tubular materials 11, 21, 31 and 51, and the second tubular materials 12, 22, 32 and 52, are joined (welded) in a factory in advance, and the second tubular materials 12, 22, 32 and 52 and the third tubular materials 13, 23, 33 and 53 are joined (welded) at the assembly site (location). In the case where they are joined (welded) in the factory, back shielding inside the pipe can be performed easily compared with joining at the site, so that it is possible to prevent oxidized scale from occurring at the internal edge of the weld zone W even if the internal edge of the weld zone W is exposed to the inside of the tube.

By so doing, the only place to be joined (welded) at an assembly site uses a piping joint structure of the present invention, so it is possible to eliminate back shielding at the time of joining (welding) completely, it is possible to prevent oxidized scale from occurring inside the tube at the time of joining (welding) at the assembly site, reliably, and it is possible to improve the working efficiency at the assembly site, which enables the working time to be shortened.

In the case of the second embodiment explained using FIG. 4, FIG. 5 and FIG. 6, the first tubular material 21 and the second tubular material 24, and the third tubular material 23 and the first tubular material 21, are joined (welded) at a factory in advance.

Moreover, when processing the inner fitting portions 14a, 24a, 34a, 54a and the outer fitting portions 15a, 25a and 35a, it is further desirable for it to be done such that the cross-sectional shapes of the surfaces of the inner fitting portions 14a, 24a, 34a, 54a located on the radial outside, and the cross-sectional shapes of the surfaces of the outer fitting portions 15a, 25a and 35a located on the radial inside, are all completely round with a curvature that is constant around the whole circumference.

By so doing, it is possible to hold the gaps between the inner fitting portions 14a, 24a and 34a and the outer fitting portions 15a, 25a and 35a, or the gap between the inner fitting portion 54a and the inner peripheral surface of one end of the third tubular material 53, almost constant around the circumference, it is possible to join (weld) the second tubular materials 12, 22, 32 and 52 and the third tubular materials 13, 23, 33 and 53 efficiently, and it is possible to improve the working efficiency at the assembly site, which enables the working time to be shortened.

In addition, it is further desirable that the gaps between the inner fitting portions 14a, 24a and 34a and the outer fitting portions 15a, 25a and 35a, or the gap (that is c1-c2 (refer to FIG. 17)) between the inner fitting portion 54a and the inner peripheral surface of one end of the third tubular material 53, are between 1.0 mm and 1.6 mm.

If the welding is performed in a state in which the gap is maintained, it is possible to prevent the internal edge of the weld zone from being exposed to the inside of the tube, and it is possible to prevent oxidized scale from occurring on the internal edge of the weld zone. If the difference is smaller than 1.0 mm, then the state in which one tubular material is inclined against the other tubular material makes it difficult to join them. If the difference is greater than 1.6 mm, the inert gas existing outside the tube flows into the gaps between the surfaces of the inner fitting portions located on the radial outside and the surfaces of the outer fitting portions located on the radial inside, or the gap between the surface of the inner fitting portion located on the radial outside and the surface of one end of the second tubular material located on the radial inside. Consequently, there is concern that the weld metal spurts into the tube, which is not desirable.

Moreover, the present invention can be applied not only to a stainless steel tubular material as described above, but it can also be applied to any tubular material such as carbon steel, aluminum, alloy steel and the like.

Furthermore, the present invention can be applied not only to a lubricating oil pipe for a power turbine as described above, but it can also be applied to any pipe for a range of plants, such as a hydraulic fluid pipe for a power turbine, a fuel oil pipe, a gas pipe, or the like, appropriately as required.

What is claimed is:

1. A piping joint structure in which an end of a first tubular material and an end of a second tubular material, which is located adjacent to the first tubular material, are joined by butt welding, wherein
an inner fitting portion is formed along a circumferential direction on an end face of said first tubular material, and a first bevel is formed on the radial outside of said inner fitting portion around the circumference, and
an outer fitting portion, which is fitted to the radial outside of said inner fitting portion, is formed on an end face of said second tubular material, and a second bevel is formed around the circumference at a location that is at the end of said outer fitting portion and that faces said first bevel,
wherein the shape of the cross-section of the face of said inner fitting portion located on the radial outside, and the shape of the cross-section of the face of said outer fitting portion located on the radial inside, are processed such that each is completely round with a curvature that is constant around the whole circumference,
wherein the first tubular material and said inner fitting portion are integrally molded,
wherein the second tubular material and said outer fitting portion are integrally molded, and
wherein a thickness of the first tubular material increases gradually between the both ends of the first tubular material along a direction of fluid flow within the piping joint structure.

2. A piping joint structure according to claim 1, wherein a thickness of said inner fitting portion is greater than or equal to 3.0 mm.

3. A piping joint structure according to claim 1, wherein a difference between a diameter of a surface located on the radial outside of said inner fitting portion and a diameter of a surface located on the radial inside of the outer fitting portion, and a difference between a diameter of a surface located on the radial outside of said inner fitting portion and a diameter of a surface located on the radial inside of an end face of said second tubular material, are between 1.0 mm to 1.6 mm.

4. A pipe joined by a piping joint structure according to claim 1.

5. A power turbine plant containing at least one pipe according to claim 4.

6. A piping joint structure according to claim 1, wherein a difference between an inner diameter and an outer diameter of the end faces of the first tubular material is greater than a difference between an inner diameter and an outer diameter of a middle portion of the first tubular material.

7. A piping joint structure according to claim 1, wherein a difference between an inner diameter and an outer diameter of the end faces of the second tubular material is greater than a difference between an inner diameter and an outer diameter of a middle portion of the second tubular material.

8. A piping joint structure according to claim 1, wherein an outer diameter of the end face of the first tubular material is substantially the same as an outer diameter of the end face of the second tubular material.

9. A piping joint structure according to claim 1, wherein an inner surface in a vicinity of the end face of the first tubular material and an inner surface in a vicinity of the end face of the second tubular material are configured to form a substantially continuous surface.

10. A piping joint structure according to claim 1,
wherein an outer diameter of the end face of the first tubular material is substantially the same as an outer diameter of a middle portion of the first tubular material, and
wherein an outer diameter of the end face of the second tubular material is substantially the same as an outer diameter of a middle portion of the second tubular material.

11. A piping joint structure according to claim 1, wherein an inner diameter of the end face of the first tubular material is substantially the same as an inner diameter of the end face of the second tubular material.

12. A piping joint structure according to claim 1, wherein an inner diameter of the end face of the first tubular material is substantially the same as an inner diameter of a middle portion of the first tubular material, and
wherein an inner diameter of the end face of the second tubular material is substantially the same as an inner diameter of a middle portion of the second tubular material.

13. A piping joint structure according to claim 1, wherein an inner diameter of the first tubular material decreases gradually along the direction of fluid flow.

14. A piping joint structure in which an end of a first tubular material and an end of a second tubular material, which is located adjacent to the first tubular material, are joined by butt welding, wherein
an inner fitting portion is formed along a circumferential direction on an end face of said first tubular material, and a first bevel is formed on the radial outside of said inner fitting portion around the circumference, and
a second bevel is formed around the circumference at a location that is at the end face of said second tubular material and that faces said first bevel;
wherein the first tubular material and said inner fitting portion are integrally molded;
wherein the second tubular material is formed in a unitary body; and
wherein a thickness of the first tubular material increases gradually between the both ends of the first tubular material along a direction of fluid flow within the piping joint structure.

15. A piping joint structure according to claim 14, which is processed such that a cross-sectional shape of a surface of said inner fitting portion located on the radial outside, and a cross-sectional shape of a surface of the end of said second tubular material located on the radial inside, are both completely round with a curvature that is constant around the whole circumference.

16. A piping joint structure according to claim 14, wherein a thickness of said inner fitting portion is greater than or equal to 3.0 mm.

17. A piping joint structure according to claim 14, wherein a difference between a diameter of a surface located on the radial outside of said inner fitting portion and a diameter of a surface located on the radial inside of the outer fitting portion, and a difference between a diameter of a surface located on the radial outside of said inner fitting portion and a diameter of a surface located on the radial inside of an end face of said second tubular material, are between 1.0 mm to 1.6 mm.

18. A pipe joined by a piping joint structure according to claim 14.

19. A power turbine plant containing at least one pipe according to claim 18.

* * * * *